United States Patent
Hucker et al.

(10) Patent No.: US 10,837,212 B2
(45) Date of Patent: Nov. 17, 2020

(54) DRIVE UNIT

(71) Applicant: Geze GmbH, Leonberg (DE)

(72) Inventors: Matthias Hucker, Marxzell (DE); Jörg Evertz, Birmensdorf (CH); Oliver Baur, Zürich (CH); Simon Thomas Hasenfratz, Zürich (CH); Remo Sommer, Zürich (CH)

(73) Assignee: Geze GmbH, Leonberg (DE)

( * ) Notice: Subject to any disclaimer, the term of this patent is extended or adjusted under 35 U.S.C. 154(b) by 411 days.

(21) Appl. No.: 15/890,126

(22) Filed: Feb. 6, 2018

(65) Prior Publication Data
US 2018/0223575 A1 Aug. 9, 2018

(30) Foreign Application Priority Data

Feb. 8, 2017 (DE) .......................... 10 2017 201 957

(51) Int. Cl.
*E05F 1/00* (2006.01)
*E05F 5/00* (2017.01)
(Continued)

(52) U.S. Cl.
CPC .............. *E05F 1/002* (2013.01); *E05F 1/004* (2013.01); *E05F 1/008* (2013.01); *E05F 1/1253* (2013.01);
(Continued)

(58) Field of Classification Search
CPC ... E05F 1/16; E05F 1/10; E05F 1/1008; E05F 1/004; E05F 3/00; E05F 3/02; E05F 3/18; E05F 5/00; E05Y 2400/302; H02P 6/00; H02P 6/005; H02P 6/006; H02P 6/008; H02P 6/04; H02P 6/06; H02P 6/08; H02P 6/181; H02P 6/182; H02P 8/00;
(Continued)

(56) References Cited

U.S. PATENT DOCUMENTS 2,549,045 A * 4/1951 Ashkenas ............... B64C 21/02
244/203
2,827,284 A * 3/1958 Heinz ................... E05F 15/624
49/32
(Continued)

FOREIGN PATENT DOCUMENTS

DE 4231984 A1 3/1994

OTHER PUBLICATIONS

EPO Office Action issued in connection with application No. 17207516.0-1005 dated Jun. 13, 2019.

*Primary Examiner* — Antony M Paul
(74) *Attorney, Agent, or Firm* — Steven M. Shape; Dennemeyer & Associates, LLC

(57) ABSTRACT

A drive unit for closing a leaf of a door or a window comprises an energy accumulator for providing a closing force for closing the leaf, a damping device which counteracts the closing force and has an electric motor which can be operated as a generator and can be coupled to an actuating element of the drive unit, and a control device for controlling the electric motor. The control device is designed to determine a nominal path curve which indicates a position of the leaf or a closing speed of the leaf in dependence upon time, and to perform the control of the electric motor in order to damp the closing movement of the leaf on the basis of the established target path curve.

20 Claims, 6 Drawing Sheets

(51) Int. Cl.
*E05F 1/12* (2006.01)
*E05F 15/611* (2015.01)
*E05F 15/79* (2015.01)
*E05F 15/71* (2015.01)
*E05F 15/63* (2015.01)
*E05F 1/16* (2006.01)
*E05F 3/00* (2006.01)
*H02P 31/00* (2006.01)

(52) U.S. Cl.
CPC .................. *E05F 1/16* (2013.01); *E05F 3/00* (2013.01); *E05F 5/00* (2013.01); *E05F 15/611* (2015.01); *E05F 15/63* (2015.01); *E05F 15/71* (2015.01); *E05F 15/79* (2015.01); *E05Y 2201/21* (2013.01); *E05Y 2201/408* (2013.01); *E05Y 2400/302* (2013.01); *E05Y 2400/32* (2013.01); *E05Y 2400/36* (2013.01); *E05Y 2400/40* (2013.01); *E05Y 2400/42* (2013.01); *E05Y 2400/456* (2013.01); *E05Y 2400/52* (2013.01); *E05Y 2400/85* (2013.01); *E05Y 2800/113* (2013.01); *E05Y 2900/132* (2013.01); *E05Y 2900/40* (2013.01); *H02P 31/00* (2013.01)

(58) Field of Classification Search
CPC ........ H02P 8/22; H02P 21/0007; H02P 27/00; H02P 27/08; H02P 1/00; H02P 1/04; H02P 1/18; H02P 1/24; H02P 1/26; H02P 1/46; H02P 1/465; H02P 3/00; H02P 3/12; H02P 3/14; H02P 3/18; H02P 3/22; H02P 21/05; G05B 5/01

USPC .......... 318/611, 400.01, 700, 701, 721, 299, 318/362, 376, 515, 516, 528, 554, 555, 318/266, 466, 800, 801

See application file for complete search history.

(56) References Cited

U.S. PATENT DOCUMENTS

| | | | |
|---|---|---|---|
| 6,452,353 | B1 | 9/2002 | Calamatas |
| 8,225,458 | B1* | 7/2012 | Hoffberg ................ E05F 3/222 16/49 |
| 8,232,754 | B2* | 7/2012 | Ozaki ................ H02H 7/0851 318/400.15 |
| 9,045,927 | B1* | 6/2015 | Hoffberg ................ E05F 15/73 |
| 9,121,217 | B1* | 9/2015 | Hoffberg ................ E05F 3/222 |
| 9,995,076 | B1* | 6/2018 | Hoffberg ................ E05F 3/10 |
| 2009/0265992 | A1 | 10/2009 | Hass |
| 2010/0242368 | A1 | 9/2010 | Yulkowski et al. |

\* cited by examiner

DRIVE UNIT

CROSS-REFERENCE TO RELATED APPLICATIONS

This application claims priority to German application 102017201957.3, filed Feb. 8, 2017, which is hereby incorporated by reference in its entirety.

The present invention relates to a drive unit for closing a leaf of a door or a window, comprising an energy accumulator for providing a closing force for closing the leaf, in particular a closing spring, a damping device which counteracts the closing force and comprises an electric motor which can be operated as a generator and can be coupled to an actuating element of the drive unit, and a control device for controlling the electric motor.

Drive units of this type are used in particular on doors and gates for this purpose, in order to close in a power-operated manner the relevant door leaf or gate leaf again after manual opening and subsequent releasing thereof. Frequently, the particular component of the drive unit, which provides the closing force, is attached to the upper edge of the door leaf and is coupled via one or more levers to a bearing element, such as a guide rail or a pivot bearing, which is arranged above the door leaf. However, it can also be the case that the bearing element is attached to the door leaf and the drive installation is attached to the frame, the wall or the ceiling.

The control device can comprise one or more switching elements and can be designed to optionally short-circuit and disconnect the motor terminals of the electric motor for the purpose of controlling or regulating the damping, and thus to effect a pulse-width modulation of the motor current, as described in DE 10 2015 200 284 B3. Such a pulse-width modulation of the motor current renders it possible e.g. to maintain a desired closing time independently of the temperature and ageing effects.

The customers for door closers and the like are becoming ever more demanding and in particular wish to benefit from a further increase in operating comfort and ease of passage.

The solution of this endeavour is achieved by means of a drive unit comprising the features of claim 1.

In accordance with the invention, the control device is designed to determine a nominal path curve which indicates a position of the leaf or a closing speed of the leaf in dependence upon time, and to perform the control of the electric motor in order to damp the closing movement of the leaf on the basis of established target path curve. By specifying the course of the closing movement, a desired closing behaviour can be set within the scope of the motor control options. In this manner it is possible to ensure a situation-oriented closing mode. Ease of passage through the associated door is thereby enhanced considerably. The control device can be designed in particular for this purpose to regulate the position of the leaf or the closing speed of the leaf in accordance with the target trajectory, i.e. to carry out either a position control or a speed control on the basis of the target trajectory. The target trajectory can indicate in particular an angle position of the leaf or an angular speed of the leaf in dependence upon time.

Developments of the invention are also specified in the dependent claims, the description, and in the attached drawing.

The control device can be designed, when establishing the target trajectory, to take into consideration a permissibility range which is determined by two limiting curves. The control device thus preferably permits only those target trajectories which can also be maintained within the scope of motor control. One of the limiting curves can be produced by omitting any damping, whereas the other limiting curve can be produced by maximum damping during the entire closing procedure.

The limiting curves can be determined in dependence upon a movement specification for the leaf to be closed, in particular a desired closing time and/or a desired final speed. Therefore, in the case of this arrangement, the control device ensures not only that the desired closing course is adhered to but in addition also that important overall parameters are adhered to independently of external influences.

Alternatively or in addition, the limiting curves can be determined in dependence upon an ascertained starting position of the leaf to be closed, a maximum damping force of the damping device and/or an adjusting reserve. The range of permissible target trajectories is hereby further restricted whilst control reliability is increased.

The control device can be designed to select the target trajectory in dependence upon a selection criterion from a set of discrete target trajectories. This permits particularly simple and rapid control because the target trajectory does not have to be calculated. In particular, it is not necessary to lay out the control device for a large amount of computing time. The discrete target trajectories can be stored in a memory of the control device or in an external memory.

The target trajectories of the set of discrete target trajectories can correspond in terms of at least one specification parameter and can differ in terms of at least one variation parameter. The specification parameter can be e.g. a movement specification, such as the closing time. Possible variation parameters like for example an initial slope of the trajectory curve, a final slope of the trajectory curve or a shape factor of the trajectory form come into consideration.

According to a further embodiment of the invention, the control device is designed to determine the target trajectory in dependence upon the current date, the current time of day and/or the current day of the week. For example, for those time segments in which a high level of footfall is to be expected through the door, a slower closing mode could be selected than for time segments in which only a low level of footfall is to be expected.

According to a further embodiment of the invention, the control device is designed to establish the desired trajectory in dependence upon an ascertained environmental parameter, in particular a temperature, temperature difference and/or air pressure. For example, in the case of low temperatures and/or a high temperature difference between the indoor area and outdoor area, a relatively rapid closing mode can be specified. In the event of wind pressure, it can be favourable to increase the closing speed or the final speed in order to ensure complete closing.

The control device can also be designed to establish the desired trajectory in dependence upon an ascertained frequency of preceding opening procedures of the leaf within a specified time period. In other words, the closing behaviour of the leaf can be adapted to the current level of footfall through the door. It is particularly favourable e.g. to keep the leaf open for longer in the event of a high level of footfall than in the event of a low level of footfall.

According to a further embodiment of the invention, the control device is designed to establish the target trajectory in dependence upon a maximum opening position of the leaf, an opening speed of the leaf and/or the form of an actual trajectory curve of the leaf during a preceding opening procedure. For example, provision can be made that the leaf is kept open for as long as possible if it has been completely opened beforehand. However, provision can be made for comparatively rapid closing when the leaf is not completely opened.

Provision can also be made that the control device comprises means for communicating with the control device of another drive unit and is designed to establish the target trajectory in dependence upon an operating state of the other drive unit. The control device can thus make provision e.g. for delayed closing if an adjacent door is opened while the door in question is still open or partially open. Then, the person who has opened the adjacent door can possibly also pass through the door in question without having to re-open it.

According to a further embodiment of the invention, the control device is designed to establish the target trajectory in response to an accident prevention criterion. For example, by suitably establishing the target trajectory, the control device can ensure compliance with a non-critical maximum value of the kinetic energy of the leaf.

The control device can be designed to redefine the desired trajectory prior to each closing procedure. Therefore, in the case of this embodiment the closing mode of a leaf provided with the drive unit is not permanently fixed like in the case of hydraulically damped door closers but instead can change depending upon use and situation.

Furthermore, the control device can be configured to redefine the desired trajectory as required during an already commenced closing procedure. Such dynamic adaptation of the closing behaviour can be favourable in many situations, for example by increasing the closing speed in accordance with an established resistance in order to ensure reliable closing.

Basically, the control device could also be configured to permanently set the target trajectory in dependence upon at least one configuration parameter. The configuration parameter could for example be selected by a technician during installation of the drive unit, e.g. by means of one or more operating units.

A special embodiment of the invention provides that the control device is configured to learn the desired trajectory on the basis of a closing procedure carried out manually. During installation, the technician can close the leaf manually in a manner which is also desired for an automatic closing procedure. This enables a particularly simple and comfortable setting of the closing mode.

The control device can be configured to perform an interpolation of supporting points of the target trajectory curve for the control of the electric motor on the basis of the established target path curve. This makes way for particularly precise control.

Alternatively, the control device can be configured to read out the target trajectory from a look-up table. In this case, the computing time is minimal.

The control device can be designed to convert the target trajectory to a desired rotational course of a motor shaft of the electric motor or an output shaft of the drive unit and to control the electric motor on the basis of the target rotational course. This renders it possible to take into consideration the transmission ratio of the motor transmission and/or the door closer linkage during the control procedure and subsequently to perform the control procedure in such a way that the course of the leaf position corresponds directly to the specified curve.

The invention also relates to a method of closing a leaf of a door or a window by means of a drive unit which has an energy accumulator for providing a closing force for closing the leaf, a damping device which counteracts the closing force and comprises an electric motor which can be operated as a generator and can be coupled to an actuating element of the drive unit, and a control device for controlling the electric motor, in particular by means of a drive unit as described above.

In accordance with the invention, a target trajectory is set which indicates a position of the leaf or a closing speed of the leaf in dependence upon time, and the control of the electric motor in order to damp the closing movement of the leaf is carried out on the basis of the established target path curve.

The invention will be described hereinafter by way of example with reference to the drawings.

Figure 1:
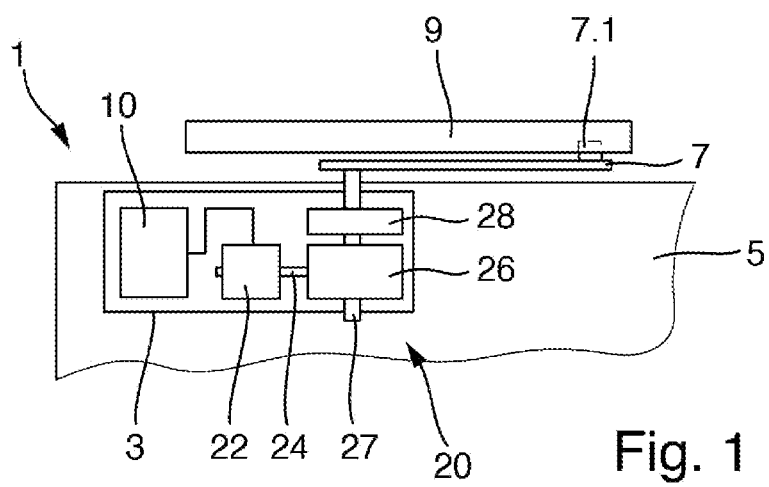
FIG. 1 is a schematic representation of a door closer in accordance with the invention.

The door closer 1 shown in FIG. 1 has a housing 3, in which a mechanical energy accumulator in the form of a closing spring 28 and a braking device 20 are arranged. The closing spring 28 is charged with potential energy by manually opening the rotatable door leaf 5, said energy then closes the released door leaf 5. The braking device 20 dampens the movement of the door leaf 5 and comprises a generator-operated electric motor 22 the motor shaft 24 of which can be rotated by a movement of the door leaf 5 and comprises the motor terminals of which, not illustrated, expends motion-dependent motor voltage which is applied to a braking circuit. The braking circuit has one or a more switching elements, via which the motor terminals can be short-circuited. An electronic control circuit 10 provided for activating the electric motor 22 performs a pulse-width modulation of the motor current and sets an effective braking force for damping the movement of the door leaf 5. Preferably, the control device 10 comprises a micro-controller. The electric motor 22 is preferably designed as a permanent-magnetically excited direct current motor. The pulse-width modulation can be carried out in particular in such a manner as indicated in DE 10 2015 200 284 B3.

In the case of the exemplified embodiment illustrated in FIG. 1, the housing 3 is mounted in a wing-fixed manner on the upper left edge region of the door leaf 5. The motor shaft 24 of the electric motor 22 is coupled via a transmission 26 with an output shaft 27 which is coupled to a sliding arm 7. The sliding arm 7 features, at its free end, a sliding block 7.1 which is guided in a sliding rail 9 mounted in a manner fixed to the frame. During opening and closing of the door leaf 5, the motor shaft 24 of the electric motor 22 is rotated by means of the transmission 26. Instead of the arrangement consisting of the sliding arm 7 and sliding rail 9, a scissor-type lever arrangement could also be provided, one end of which sits in a pivot bearing fixed to the frame.

Figure 2:
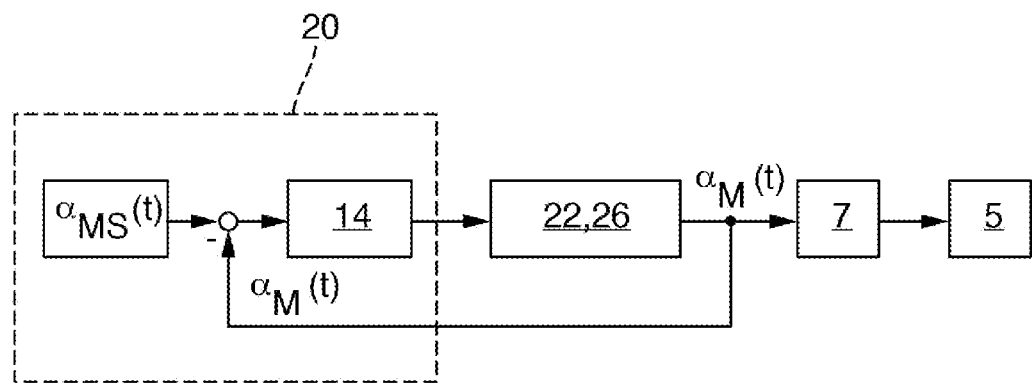
FIG. 2 is a block diagram illustrating a position regulation of the door closer shown in FIG. 1.
Figure 3:
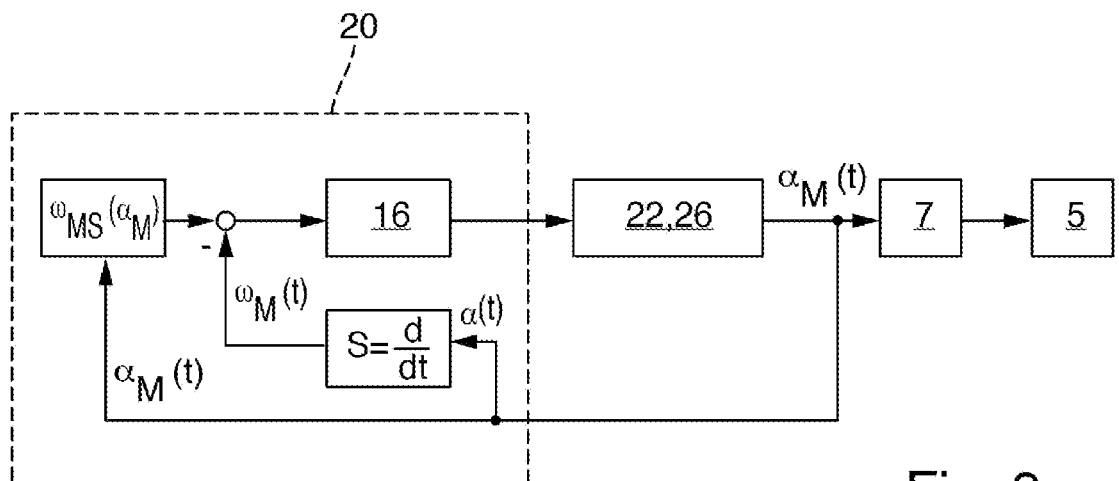
FIG. 3 is a block diagram illustrating a speed regulation of the door closer shown in FIG. 1.

The control device 10 is designed to determine a nominal path curve which indicates the opening angle α of the door leaf 5 in dependence upon time t. The damping of the closing movement of the door leaf 5 as executed by means of the electric motor 22 is carried out on the basis of the established target path curve. The regulation itself is effected in this case according to basically known principles, e.g. by means of a position regulator 14, as illustrated in FIG. 2, or by means of a speed regulator 16, as illustrated in FIG. 3. In FIGS. 2 and 3, $α_M(t)$ designates the actual angular position of the motor shaft 24 or of the output shaft 27 as a function of time, $ω_M(t)$ designates the actual angular speed of the motor shaft 24 or of the output shaft 27 as a function of time, $α(t)$ designates the angular position of the door leaf 5 as a function of time, $α_{MS}(t)$ designates the desired angular position of the motor shaft 24 or of the output shaft 27 as a function of time and $ω_{MS}(t)$ designates the desired angular speed of the motor shaft 24 or of the output shaft 27 as a function of time. The establishing of the desired trajectory can comprise an interpolation of specified supporting points. Alternatively, the desired trajectory can be read out from a look-up table. The control device 10 defines trajectories which can be technically achieved within the range, those which are associated with a specific ease of passage through the door.

Figure 4:
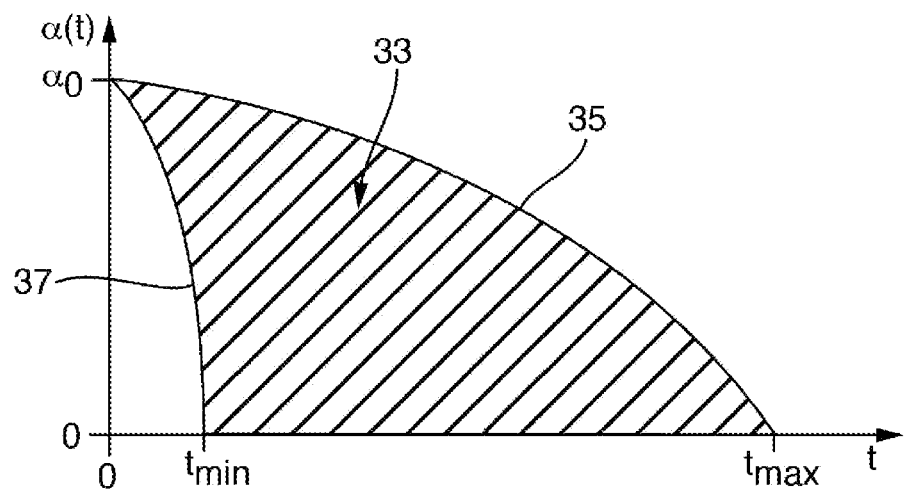
FIG. 4 is a diagram indicating the range of permissible trajectories of a door leaf.

Since the door closer 1 shown in FIG. 1 is autonomously carried out, the braking device 20 can only brake the door leaf 5, not accelerate or stop it. Moreover, owing to unavoidable friction losses, the construction of the door closer 1 does not permit a braking force of any magnitude. These and similar circumstances limit the selection of the trajectories which the control device 10 can use in order to dampen the closing movement of the door leaf 5. FIG. 4 illustrates by way of example a first permissibility range 33 of possible trajectories in an opening angle-time graph. $α_0$ designates the starting angle, $t_{min}$ designates the minimum closing time and $t_{max}$ designates the maximum closing time. The upper limit curve 35 of the first permissibility range 33 is given by the fact that a maximum damping is provided, i.e. the motor terminals of the electric motor 22 are short-circuited during the entire closing procedure. The lower limit curve 37 is given by the fact that no damping at all is provided, i.e. the motor terminals of the electric motor 22 are disconnected during the entire closing procedure.

Figure 5:
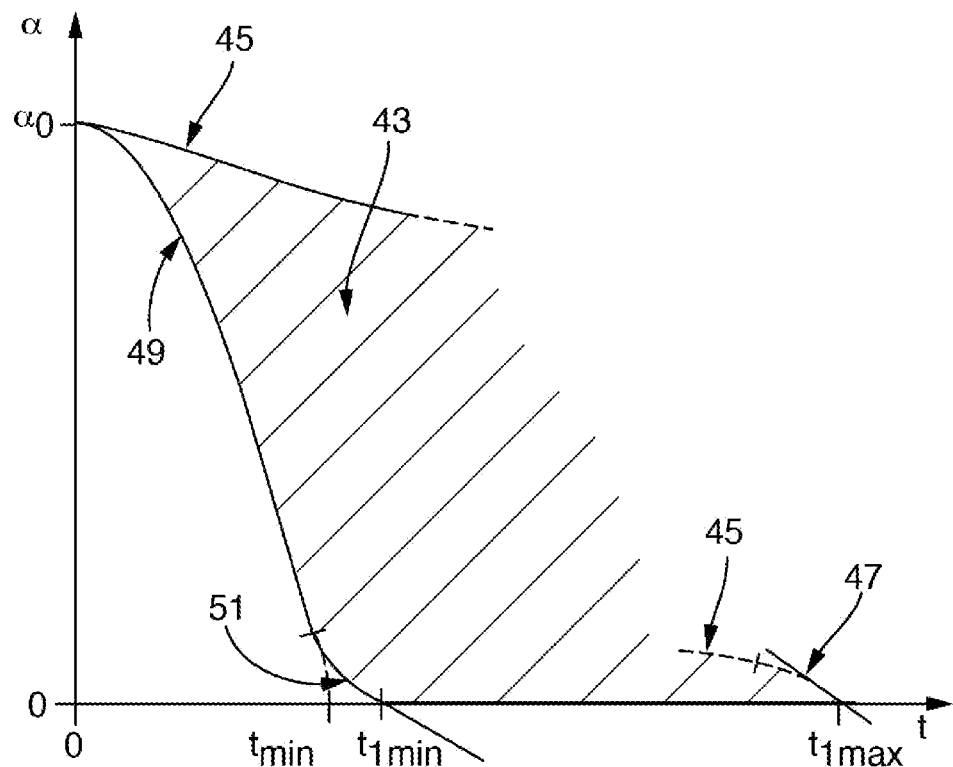
FIG. 5 shows a range of permissible trajectories of a door leaf restricted by additional specifications.

If it is required that the door leaf 5 is to reach the closed position at the final angular speed $ω_e$, then the selection of possible trajectories is restricted to the second permissibility range 43 shown in FIG. 5. The limiting curve portion 45 is derived from the fact that the door leaf 5 starts at $α_0$ with the initial angular speed at 0 and is damped during the closing procedure by the maximum possible braking torque. The limiting curve portion 47 is derived from the fact that the closed position is reached at the final angular speed $ω_e$ and that there is a smooth transition to the limiting curve portion 45. The limiting curve portion 49 is derived from the fact that the door leaf 5 starts at $α_0$ with the initial angular speed at 0 and is not damped so that the acceleration is at maximum. The limiting curve portion 51 is derived from the fact that the closed position is reached at the desired final angular speed $ω_e$ and that there is a smooth transition to the limiting curve portion 49. With respect to the first permissibility range 33, the times for the beginning and the end of the closing procedure shift from times $t_{min}$ and $t_{max}$ to times $t_{1min}$ and $t_{1max}$.

Figure 6:
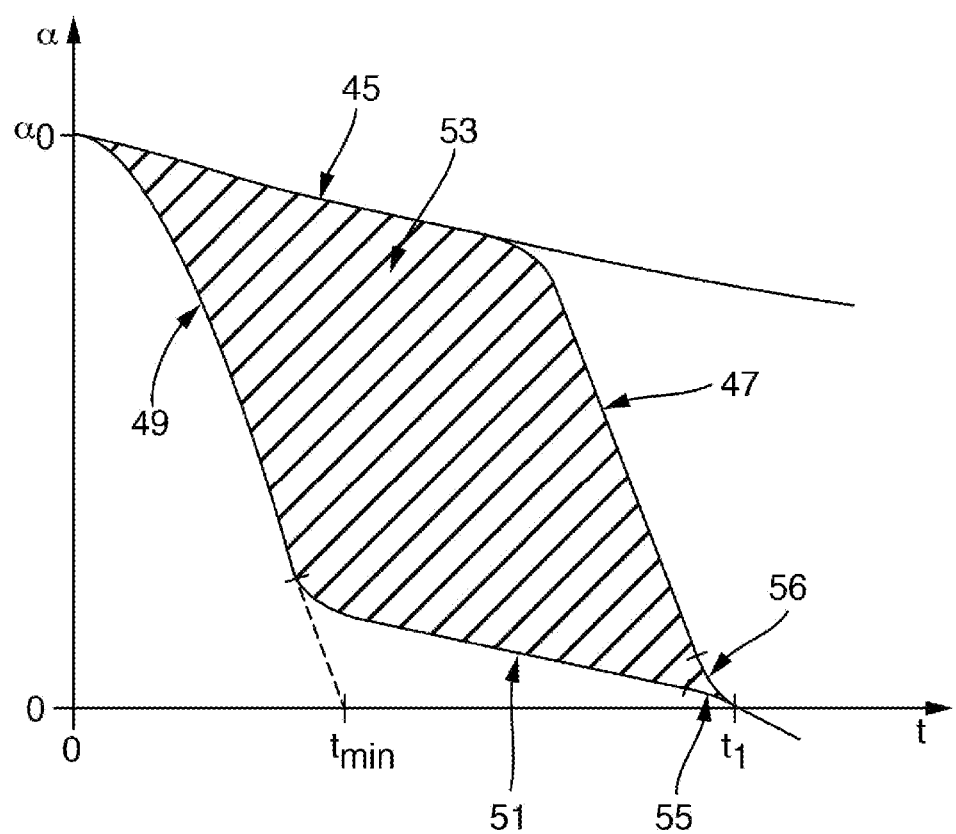
FIG. 6 shows a further restricted range of permissible trajectories of a door leaf.

In addition, if it is required that the door leaf 5 reaches the closed position after the fixedly specified closing time $t_1$ at the final angular speed $ω_e$, a further restricted third permissibility range 53 is provided, as illustrated in FIG. 6. The limiting curve portion 55 is derived from the fact that the door leaf 5 reaches the closed position completely without damping at the desired final angular speed $ω_e$. The limiting curve portion 56 is derived from the fact that the door leaf 5 reaches the closed position with maximum damping at the desired final angular speed $ω_e$. The third permissibility range 53 indicates the amount of all possible trajectories, in which the door leaf 5 reaches the closed position at time $t_1$ from the starting angle $α_0$ at the final angular speed $ω_e$. However, the shape of the realisable trajectories within the section 53 is subject to certain restrictions because the electric motor 22 e.g. the door leaf 5 cannot accelerate or stop.

Figure 7:
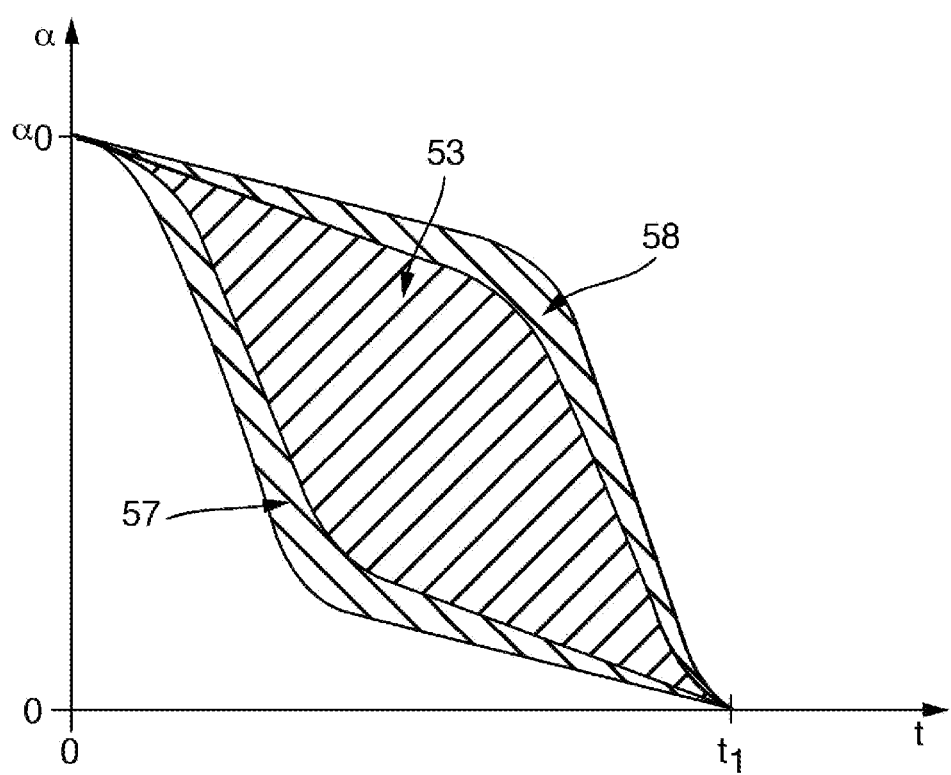
FIG. 7 shows a range of permissible trajectories of a door leaf further restricted by an adjusting reserve.

In order to ensure that sufficient adjusting reserve remains for the purpose of regulating to a selected desired trajectory, the range of possible trajectories is further restricted in that, as shown in FIG. 7, edge regions 57, 58 of the third permissibility range 53 are kept free.

Figure 8:
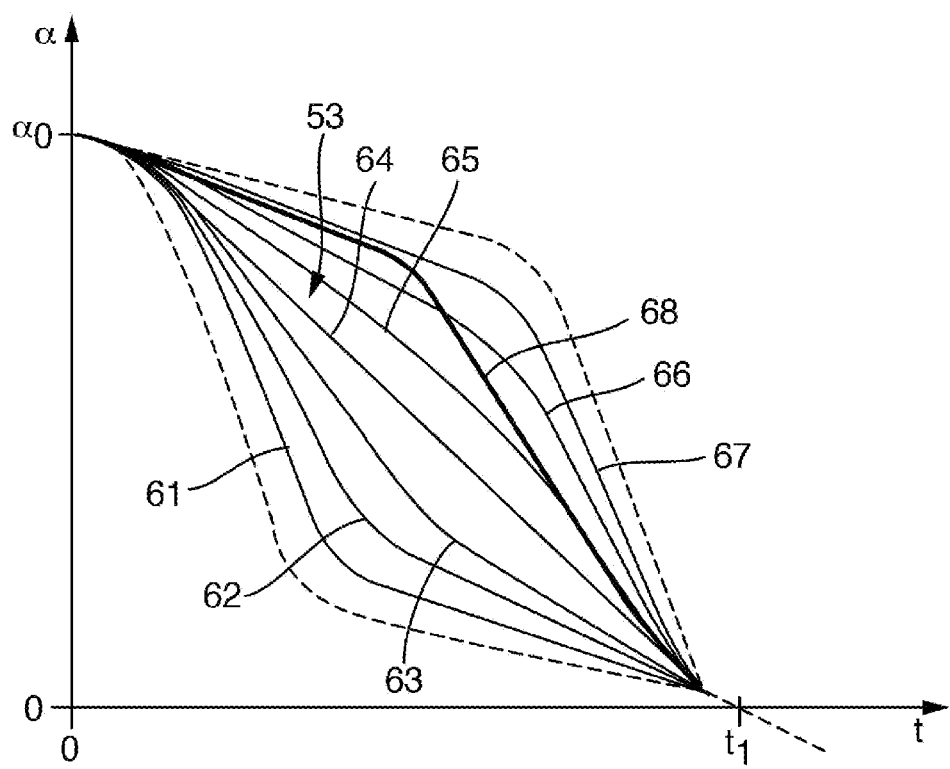
FIG. 8 shows a set of discrete target trajectory curves for a door leaf.

Desired trajectories for the closing procedure which are characterised by particular properties are now defined within the third permissibility range 53. Examples of different defined desired trajectories 61-68 are illustrated in FIG. 8. All of the illustrated desired trajectories 61-68, close the door leaf 5 at time $t_1$ from the opening angle $α_0$ and reach the closed position at the final angular speed $ω_e$.

The reference sign 67 designates the particular desired trajectory in which the door leaf 5 commences the closing procedure with maximum damping, the maximum damping is maintained for as long as possible and subsequently a closing procedure which is as rapid as possible is carried out in order to reach the final position at the specified final angular speed $ω_e$. The reference sign 61 designates the particular desired trajectory in which the door leaf 5 starts and closes as rapidly as possible, and thereafter the closing procedure is continued as slowly as possible prior to reaching the closed position. This can be favourable in particular for reasons of personal protection. The reference sign 64 designates the particular desired trajectory in which the door leaf 5 closes for as long as possible at a constant angular speed in order to reach the closed position at the desired final angular speed $ω_e$. The desired trajectories designated by the reference signs 62, 63, 65 and 66 are so-called intermediate paths which, in principle, can be of any number. The desired trajectory to be selected for a specific closing procedure is selected by specifying a path parameter 1 to 7. Basically, other forms of desired trajectories are possible within the third permissibility range 53, e.g. the desired trajectory 68 in which the door leaf 5 closes initially with maximum damping and then at a constant angular speed in order thereafter to reach the closed position at the desired final angular speed $ω_e$.

The control device 10 calculates the desired trajectories 61-68 prior to each closing procedure from supporting points with interpolation or selects the respective desired trajectory 61-68 from a look-up table prior to each closing procedure. The input variable used is preferably the actual angle $α_M(t)$ of the motor shaft 24 or of the output shaft 27 detected by means of incremental encoders. By taking the type of mounting into account, the control device 10 converts the relevant trajectories for the door leaf 5 into trajectories for the motor shaft 24 or the output shaft 27. Therefore, the trajectory can be regulated for the door leaf 5 independently of the type of mounting.

The desired trajectory 61-68 to be used for the regulation can be parameterised and statically specified by the technician when installing the door closer 1. The door closer 1 then closes the door leaf 5 independently of environmental influences, such as temperature or wind pressure in the specified closing time $t_1$ at the specified final angular speed $\omega_e$.

However, it is preferred that the control device 10 selects the desired trajectory 61-68 to be used for regulating the closing procedure depending upon the situation prior to each closing procedure or even dynamically adapts said trajectory during the closing procedure. In particular, the desired trajectory 61-68 can be selected depending upon the level of footfall through the door leaf 5. Preferably, the door leaf 5 remains open for longer when the level of footfall is high than when the level of footfall is low. Alternatively or in addition, the desired trajectory 61-68 can be selected in dependence upon the time of day, the day of the week or the date. In particular, when the level of footfall is expected to be high the door can be kept open for as long as possible. If only a low level of footfall is to be expected, comparatively rapid closing of the door leaf 5 can be provided. The desired trajectory 61-68 can also be selected depending upon the temperature. Specifically, particularly rapid closing of the door leaf 5 can be provided if there is a large temperature difference between the indoor area and outdoor area. For this purpose, the door closer 1 can be provided with suitable sensor inputs. Provision can also be made that the door leaf 5 is kept open for as long as possible, i.e. is damped to the maximum extent, if the door leaf 5 has been completely opened beforehand, that is for example up to an opening angle of 90°. However, if the door leaf 5 has not been completely opened beforehand, it is preferred to authorise comparatively rapid closing.

Provision can also be made that the door leaf 5 closes relatively slowly if an obstacle has been established during the preceding closing procedure. Moreover, provision can be made that the door leaf 5 closes relatively rapidly if it has also been opened rapidly beforehand. However, rather slow closing can be provided if the door leaf 5 has been opened slowly or shakily beforehand. In the latter case, it is namely probable that a person carrying heavy luggage or an elderly person is going through the door.

Figure 9:
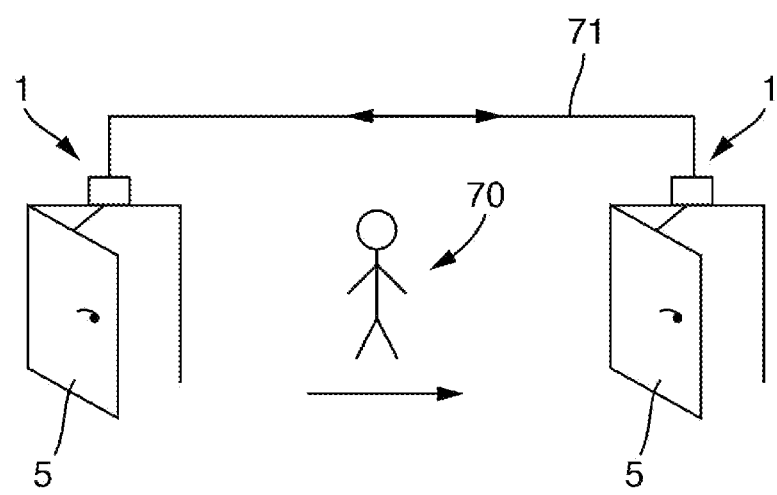
FIG. 9 shows two mutually communicating door closers in accordance with the invention.

If, as shown in FIG. 9, an adjacent door leaf 5 is opened while the door leaf 5 in question is still not closed, the door closer 1 can increase the damping to a maximum value so that a person 70 can possibly also pass through the second door without having to open the door leaf 5 thereof. For this purpose, the corresponding door closers 1 can be networked to one another via a signal line 71 or wirelessly.

In a simple manner, the invention allows the closing behaviour of a door closer 1 to be adapted to the appropriate situation.

REFERENCE SIGN LIST

1 door closer
3 housing
5 door leaf
7 sliding arm
7.1 sliding block
9 sliding rail
10 control device
14 position regulator
16 speed regulator
20 braking apparatus
22 electric motor
24 motor shaft
26 transmission
27 output shaft
28 closing spring
33 first permissibility range
35 upper limit curve
37 lower limit curve
43 second permissibility range
45 limiting curve portion
47 limiting curve portion
49 limiting curve portion
51 limiting curve portion
53 third permissibility range
55 limiting curve portion
56 limiting curve portion
57 edge region
58 edge region
61-68 desired trajectory
70 person
71 signal line

The invention claimed is:

1. A drive unit (1) for closing a leaf (5) of a door or a window, comprising an energy accumulator (28) for providing a closing force for closing the leaf (5), in particular a closing spring, a damping device (20) which counteracts the closing force and comprises an electric motor (22) which can be operated as a generator and can be coupled to an actuating element (27) of the drive unit (1), and a control device (10) for activating the electric motor (22), wherein
the control device (10) is designed to establish a desired trajectory (61-68) which indicates a position of the leaf (5) or a closing speed of the leaf (5) in dependence upon time, and for the control of the electric motor (22) in order to damp the closing movement of the leaf (5) on the basis of the established target path curve (61-68).

2. The drive unit according to claim 1
wherein
the control device (10) is designed, when establishing the desired trajectory (61-68), to take into consideration a permissibility range (33, 43, 53) which is determined by two limiting curves (35, 37).

3. The drive unit according to claim 2
wherein
the limiting curves (35, 37) are determined in dependence upon a movement specification for the leaf (5) to be closed, in particular a desired closing time and/or a desired final speed.

4. The drive unit according to claim 2
wherein
the limiting curves (35, 37) are determined in dependence upon an ascertained starting position of the leaf (5) to be closed, a maximum damping force of the damping device (20) and/or an adjusting reserve.

5. The drive unit according to claim 1
wherein
the control device (10) is designed to select the desired trajectory (61-68) in dependence upon a selection criterion from a set of discrete desired trajectories (61-68).

6. The drive unit according to claim 5,
wherein
the desired trajectories (61-68) of the set of discrete desired trajectories can correspond in terms of at least one specification parameter and can differ in terms of at least one variation parameter.

7. The drive unit according to claim 1
wherein
the control device (10) is designed to establish the desired trajectory (61-68) in dependence upon the current date, the current time of day and/or the current day of the week.

8. The drive unit according to claim 1
wherein
the control device (10) is designed to establish the desired trajectory (61-68) in dependence upon an ascertained environmental parameter, in particular a temperature, temperature difference and/or air pressure.

9. The drive unit according to claim 1
wherein
the control device (10) is also designed to establish the desired trajectory (61-68) in dependence upon an ascertained frequency of preceding opening procedures of the leaf (5) within a specified time period.

10. The drive unit according to claim 1
wherein
the control device (10) is designed to establish the desired trajectory (61-68) in dependence upon a maximum opening position of the leaf (5), an opening speed of the leaf (5) and/or the form of an actual trajectory of the leaf (5) during a preceding opening procedure.

11. The drive unit according to claim 1
wherein
the control device (10) comprises means (71) for communicating with the control device (10) of a further drive unit (1) and is designed to establish the desired trajectory (61-68) in dependence upon an operating state of the further drive unit (1).

12. The drive unit according to claim 1
wherein
the control device (10) is designed to establish the desired trajectory (61-68) in dependence upon an accident prevention criterion.

13. The drive unit according to claim 1
wherein
the control device (10) is designed to re-establish the desired trajectory (61-68) prior to each closing procedure.

14. The drive unit according to claim 1
wherein
the control device (10) is designed to re-establish the desired trajectory (61-68) as required during an already commenced closing procedure.

15. The drive unit according to claim 1
wherein
the control device (10) is designed to permanently establish the desired trajectory (61-68) in dependence upon at least one configuration parameter.

16. The drive unit according to claim 1
wherein
the control device (10) is designed to learn the desired trajectory (61-68) on the basis of a procedure carried out manually.

17. The drive unit according to claim 1
wherein
the control device (10) is designed to perform an interpolation of supporting points of the desired trajectory (61-68) for the control of the electric motor (22) on the basis of the established target path curve (61-68).

18. The drive unit according to claim 1
wherein
the control device (10) is designed to read out the desired trajectory (61-68) from a look-up table.

19. The drive unit according to claim 1
wherein
the control device (10) is designed to convert the desired trajectory (61-68) to a desired rotational course of a motor shaft (24) of the electric motor (22) or an output shaft (27) of the drive unit (1) and to activate the electric motor (22) on the basis of the desired rotational course.

20. A method of closing a leaf (5) of a door or a window by means of a drive unit (1) which has an energy accumulator (28) for providing a closing force for closing the leaf (5), a damping device (20) which counteracts the closing force and comprises an electric motor (22) which can be operated as a generator and can be coupled to an actuating element (27) of the drive unit (1), and a control device (10) for activating the electric motor (22), in particular by means of a drive unit (1) according to claim 1,
wherein
a desired trajectory (61-68) is established which indicates a position of the leaf (5) or a closing speed of leaf (5) in dependence upon time, and the control of the electric motor (22) in order to damp the closing movement of the leaf (5) is carried out on the basis of the established target path curve (61-68).

* * * * *